(12) United States Patent
Pailler et al.

(10) Patent No.: US 10,471,873 B2
(45) Date of Patent: Nov. 12, 2019

(54) DEVICE FOR ROTATING A SEAT, PARTICULARLY FOR A RAILWAY VEHICLE

(71) Applicant: ALSTOM TRANSPORT TECHNOLOGIES, Saint-Ouen (FR)

(72) Inventors: Christophe Pailler, Perigny (FR); Jean-Louis Lugol, Verines (FR); Julien Febvre, Evreux (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 15/970,176

(22) Filed: May 3, 2018

(65) Prior Publication Data

US 2018/0326884 A1    Nov. 15, 2018

(30) Foreign Application Priority Data

May 4, 2017    (FR) ..................................... 17 53940

(51) Int. Cl.
| | |
|---|---|
| *B60N 2/14* | (2006.01) |
| *B60N 2/90* | (2018.01) |
| *B60N 3/06* | (2006.01) |
| *B61D 33/00* | (2006.01) |
| *B60N 2/07* | (2006.01) |

(52) U.S. Cl.
CPC .......... *B60N 2/933* (2018.02); *B60N 2/0742* (2013.01); *B60N 2/14* (2013.01); *B60N 2/143* (2013.01); *B60N 2/146* (2013.01); *B60N 3/06* (2013.01); *B61D 33/005* (2013.01); *B61D 33/0085* (2013.01)

(58) Field of Classification Search
CPC ............ A47C 3/18; B60N 2/146; B66C 23/00
USPC ................... 297/344.21, 344.22; 248/425
See application file for complete search history.

(56) References Cited

U.S. PATENT DOCUMENTS

| | | | |
|---|---|---|---|
| 2,591,598 A | | 4/1952 | Owler |
| 5,540,482 A | * | 7/1996 | Baret ...................... B60N 2/14 |
| | | | 297/344.22 |

(Continued)

FOREIGN PATENT DOCUMENTS

| | | |
|---|---|---|
| CN | 200948754 Y | 9/2007 |
| CN | 201254186 Y | 6/2009 |

(Continued)

OTHER PUBLICATIONS

Preliminary Search Report dated Jan. 17, 2018 during the prosecution of French Patent Application No. 1753940.

*Primary Examiner* — Rodney B White
(74) *Attorney, Agent, or Firm* — Troutman Sanders LLP

(57) ABSTRACT

The rotation device includes means for locking the seat in extreme angular positions, comprising a movable abutment carried by the seat, and interacting with a complimentary fixed abutment when the seat is in one of its extreme angular positions. The movable abutment may be moved between a locked position in which it abuts the fixed abutment, and an unlocked position in which it is above the fixed abutment. The device has a means for unlocking the seat, wherein it comprises at least one pneumatic control member and pneumatic means for driving the movable abutment from its locked position to its unlocked position when the control member is actuated.

8 Claims, 2 Drawing Sheets

(56) References Cited

U.S. PATENT DOCUMENTS

| | | | | |
|---|---|---|---|---|
| 5,733,006 | A * | 3/1998 | Woods | A47C 3/18 |
| | | | | 297/344.22 X |
| 5,904,399 | A * | 5/1999 | Kim | B60N 2/146 |
| | | | | 248/425 |
| 6,520,579 | B2 * | 2/2003 | Kassai | B60N 2/146 |
| | | | | 297/344.21 X |
| 6,916,065 | B2 * | 7/2005 | Park | A61B 1/00048 |
| | | | | 297/344.21 X |
| 7,758,007 | B2 * | 7/2010 | Link | B60N 2/14 |
| | | | | 297/344.21 X |
| 2007/0246987 | A1 * | 10/2007 | Sano | B60N 2/146 |
| | | | | 297/344.21 X |
| 2008/0035408 | A1 * | 2/2008 | Gristenbrei | B60N 2/143 |
| | | | | 297/344.21 X |
| 2009/0174246 | A1 * | 7/2009 | Kaip | B60N 2/01583 |
| | | | | 297/344.21 |
| 2010/0253123 | A1 * | 10/2010 | DeCraene | B60N 2/14 |
| | | | | 297/344.22 |
| 2012/0200132 | A1 * | 8/2012 | Collene | A47C 3/185 |
| | | | | 297/344.21 |
| 2015/0151655 | A1 * | 6/2015 | Peterson | E21F 13/025 |
| | | | | 297/344.21 |
| 2017/0320406 | A1 * | 11/2017 | Roeglin | B60N 2/10 |
| 2018/0043798 | A1 * | 2/2018 | Jacobson | B64D 11/0639 |

FOREIGN PATENT DOCUMENTS

| | | |
|---|---|---|
| CN | 202016471 U | 10/2011 |
| CN | 202987165 U | 6/2013 |
| DE | 102014013955 A | 3/2016 |
| GB | 774510 A | 5/1957 |

\* cited by examiner

DEVICE FOR ROTATING A SEAT, PARTICULARLY FOR A RAILWAY VEHICLE

CROSS-REFERENCE TO RELATED APPLICATIONS

The present application claims priority from French Patent Application No. FR 17 53940 filed May 4, 2017. The entire contents of which are incorporated herein by reference.

The present invention relates to a device for rotating a seat, in particular for a railway vehicle.

Such a rotation device is more particularly intended to equip a passenger compartment of a railway vehicle, in particular a high-speed train or any mainline train.

In fact, the rotation device is intended to allow the orientation of the corresponding seat in the direction of travel of the vehicle and so improve the comfort of the passenger using the seat.

Thus, before each journey of the railway vehicle, an operative actuates the rotation device in order to orient the seat in the desired direction.

The present invention is intended, in particular, to provide a rotation device that may be implemented quickly, simply and ergonomically.

To this end, the object of the invention is, in particular, to provide a device for rotating a seat about a vertical axis, wherein the seat is intended to equip a railway vehicle, characterized in that it comprises:

means to lock the seat in the first or second extreme angular positions of the seat, wherein the locking means comprise at least one movable abutment carried by the seat and designed to interact with a first or a second complementary fixed abutment when the seat is respectively in one of its first or second extreme angular positions, wherein the movable abutment may be moved between a locked position in which it is at the corresponding first or second fixed abutment, and an unlocked position in which it is located above the corresponding first or second fixed abutment, and means for unlocking the seat, comprise:
at least one pneumatic control member, and
pneumatic means for driving the movable abutment from its locked position to its unlocked position when the control member is actuated.

A rotation device according to the invention may further comprise one or more of the following features, taken alone or in any technically feasible combination:

the pneumatic drive means comprise a pneumatic cylinder with a rod interacting with the movable abutment.

the rod is provided with a handle, allowing manual displacement in the event of failure of the pneumatic drive means.

the rotation device comprises a seat support structure, wherein the first control member is in the form of a pedal arranged on the support structure.

the unlocking means are designed to remain active when the seat is in an intermediate angular position between the extreme angular positions.

the movable abutment is rotatably movable about a pivot linkage carried by the seat.

the seat is equipped with a rear footrest that may be moved between a position of use and a raised position, wherein the rotation device comprises means for driving the footrest to its raised position during the rotation of the seat.

the rotation device according to any one of the preceding claims comprises a seat support structure, wherein the support structure comprises an abutment for lateral wedging of the seat in the first or second extreme position.

the support structure comprises two shoulders designed to interact with means on this support structure to house the seat when it is in one of the extreme angular positions.

The invention will be better understood upon reading the description which follows, given solely by way of example and with reference to the appended figures, wherein:

FIG. 1 shows a seat 8 designed to equip a rail vehicle, and more particularly designed to equip a passenger compartment of the railway vehicle.

Figure 3:
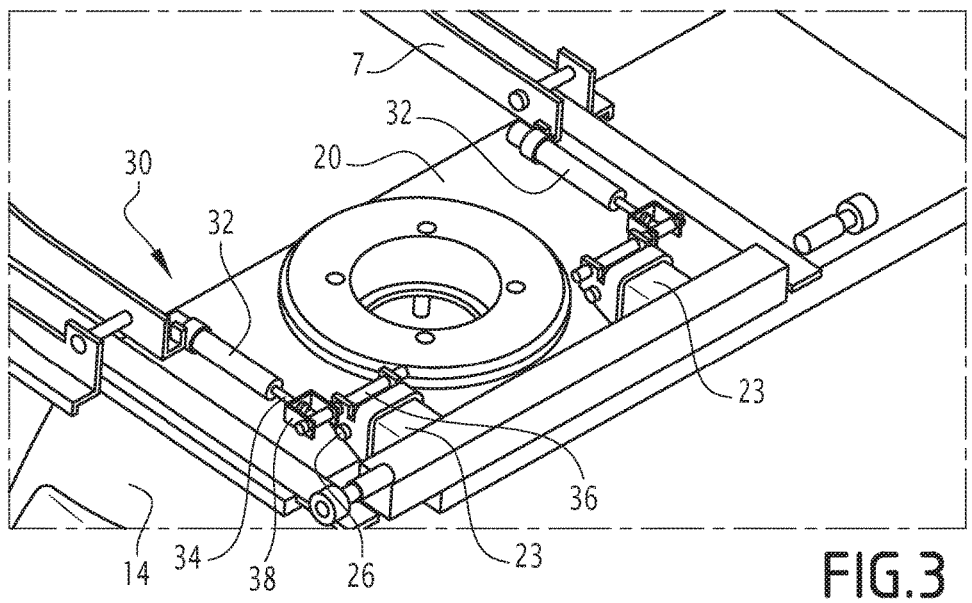
FIG. 3 shows a perspective view of pneumatic unlocking means equipping the seat of FIG. 1.

In the example described, the seat 8 is of a single type, intended to be used by one person. Such a single seat comprises a frame 7 (visible in FIG. 3), a seat 8A and a backrest 8B carried by the frame 7, and at least one armrest 9, in particular two armrests 9 arranged on either side of the seat 8A.

Alternatively, the seat 8 could be of the double type, intended to be used by two people. Such a double seat has two seats arranged next to each other, and two backrests, each extending from a respective seat. A double seat also has armrests, for example three armrests (an armrest between the seats, and the other armrests on either side of the double seat) or four armrests (two armrests on either side of each seat).

The seat 8 is equipped with a rotation device 10, allowing the seat 8 to rotate about a vertical axis between two extreme angular positions. The rotation device 10 allows, for example, a seat rotation of 180° in order to align the seat with the longitudinal direction of the train in one direction or the other.

Figure 1:
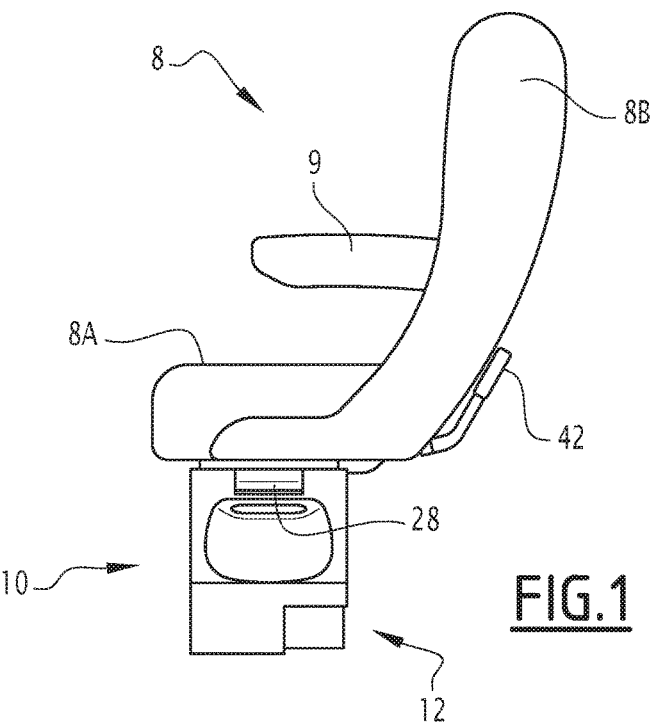
FIG. 1 shows a side view of a railway vehicle seat equipped with a rotation device according to an exemplary embodiment of the invention.
Figure 2:
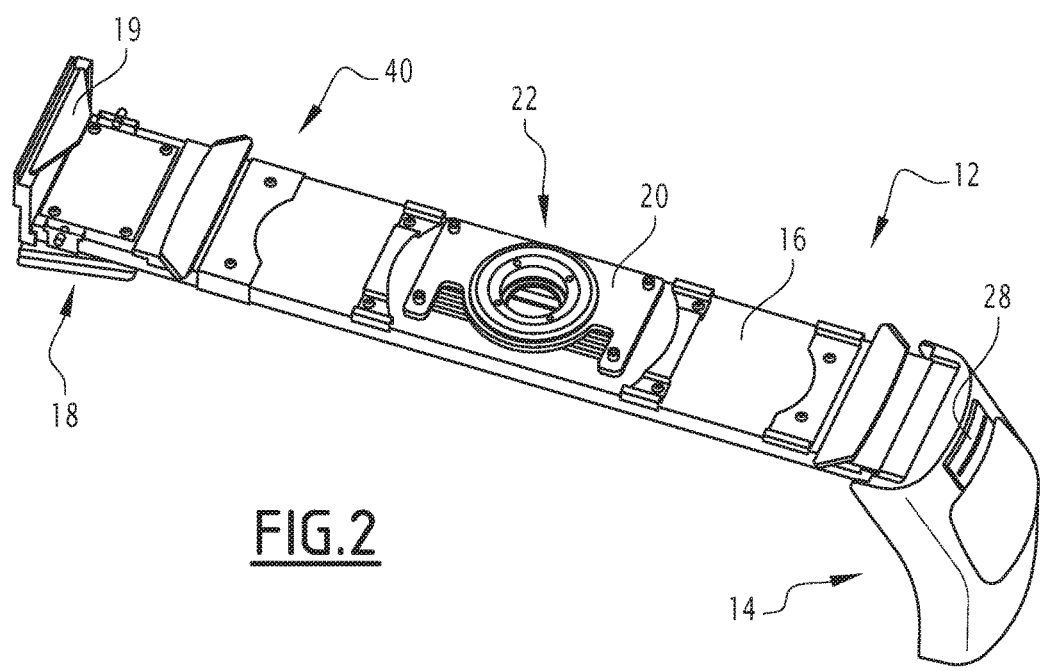
FIG. 2 shows a perspective view of a support of the seat of FIG. 1.

The rotation device 10 comprises a seat support structure 12 that is shown in greater detail in FIG. 2.

The support structure 12 comprises a foot 14 intended to be turned towards a passageway adjacent to the seat 8, a support plate 16 carried by the foot 14, and an attachment member 18. In the example described, the attachment member 18 attaches the support structure 12 to a side wall delimiting the passenger compartment. Alternatively, the attachment member 18 could be formed by another foot of similar shape to that of the foot 14.

Advantageously, the attachment member 18 carries an abutment 19 for wedging the seat 8 to limit the lateral movements of the seat 8 when the seat 8 is locked in position.

The support structure 12 comprises a base 20 to receive the seat 8 wherein it is rotatable about the vertical axis between the first and second extreme angular positions, which respectively correspond to opposite directions in the longitudinal direction of the train. The base 20 is connected to the support plate 16 by means of a pivot linkage 22 defined around the vertical axis.

The rotation device 10 further comprises means for locking the seat 8 in either of the two extreme angular positions. The locking means comprise, for example, at least one first locking element 23 carried by the seat 8, and at least one second complementary locking element 25 carried by the support structure 12. The first locking element 23 interacts with the second locking element 25 when the seat 8 is locked in position.

More particularly, the first locking element 23 forms a movable abutment carried by the seat 8, in particular by the frame 7, while the second locking element 25 forms a fixed abutment carried by the support structure 12.

Advantageously, the locking means comprise two second locking elements 25, i.e. a first fixed abutment interacting with the mobile abutment 23 when the seat is in the first extreme angular position, and a second fixed abutment interacting with the mobile abutment 23 when the seat is in the second extreme angular position.

Figure 4:
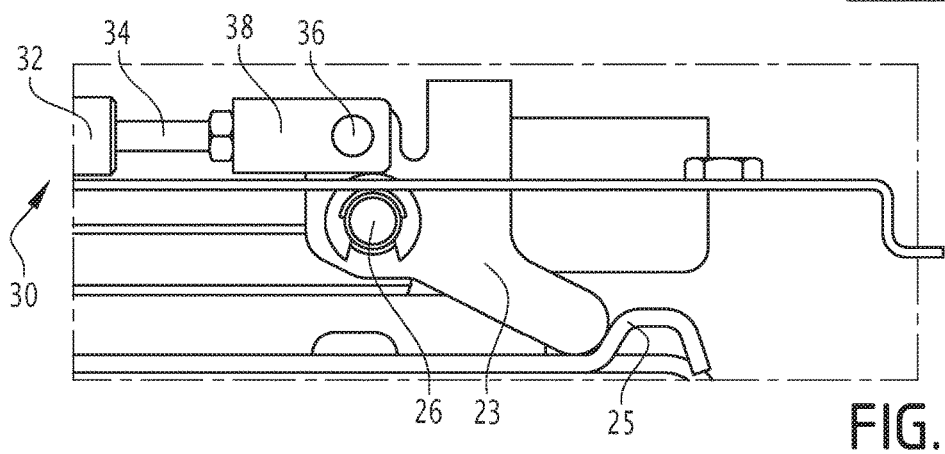
FIGS. 4 and 5 show side views partially showing the pneumatic unlocking means of FIG. 3 respectively in a locked position and an unlocked position.
Figure 5:
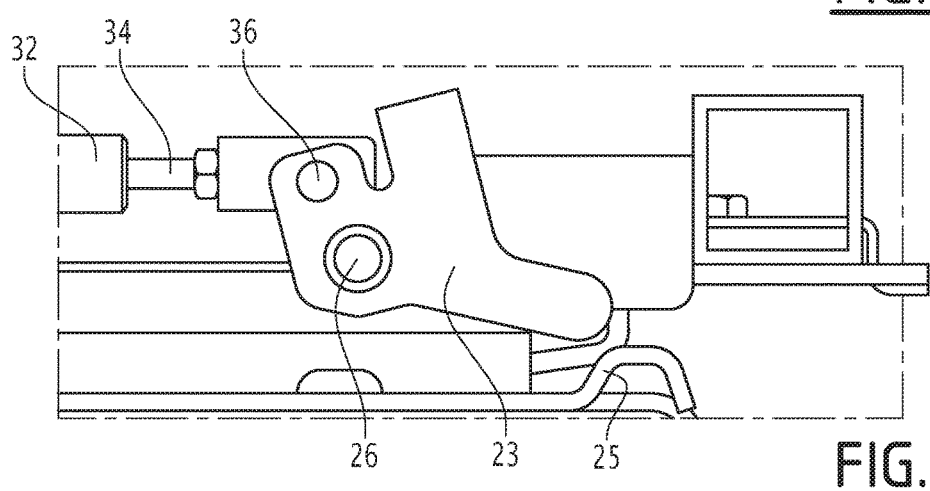

The movable abutment 23 may be moved between a locked position in which it is at least partly at the level of the corresponding first or second fixed abutment 25 (as shown in FIG. 4), and an unlocked position in which it is entirely above the corresponding first or second fixed abutment 25 (as shown in FIG. 5).

In the locked position, the movable abutment 23 abuts the corresponding fixed abutment 25, thus preventing any rotation of the seat 8.

On the other hand, in the unlocked position, the movable abutment 23 extends above the corresponding fixed abutment 25, so that the abutments 23, 25 do not hinder the rotation of the seat 8.

Preferably, the mobile abutment 23 is rotatable about a pivot linkage 26 carried by the seat 8.

Advantageously, the locking means comprise two movable abutments 23, wherein each interacts with a respective fixed abutment 25 at each end position of the seat 8.

The rotation device 10 also comprises means for unlocking the seat 8, wherein they comprise at least one pneumatic control member 28 and pneumatic means 30 for driving the movable abutment 23 from its locked position to its unlocked position when the control member 28 is actuated.

For example, the control member 28 may be in the form of a pedal arranged on the support structure 12, and more particularly on the foot 14 of the support structure 12. The foot 14 is arranged at the side of the passageway adjacent to the seat 8, wherein the pedal 28 is accessible from this passageway, and may be actuated by an action of a foot of the operative. The pedal 28 thus has dimensions that are large enough to easily allow such actuation by the operative's foot.

Advantageously, the pedal 28 has an accessible non-slip surface. For example, for this purpose, the accessible surface may be embossed.

The pedal 28 may, for example, be articulated by sliding in the foot 14, wherein this articulation is, for example, provided by means of friction rings. A return spring is arranged in the foot 14, for the elastic return of the pedal 28 to its initial position after actuation. The sliding of the pedal 28 is preferably limited by mechanical abutments.

The pedal 28 is advantageously arranged in an upper part of the foot 14, and it is preferably at least partially hidden by the seat.

Upon actuation, the pedal 28 triggers a pneumatic sensor controlling the pneumatic drive means 30.

Advantageously, the pneumatic drive means 30 comprise a pneumatic cylinder 32 carried by the frame 7, and comprise a rod 34 interacting with the movable abutment 23. For example, the rod 34 may be connected to the mobile abutment 23 by a linkage 36 pivoting about an axis offset from the axis of the pivot linkage 26. Thus, the displacement of the rod 34 causes the pivoting of the movable abutment 23 about the pivot connection 26.

Preferably, the rod 34 is provided with a handle 38, allowing its manual movement in the event of failure of the pneumatic drive means 30.

In the case where the locking means comprise two movable abutments 23, the unlocking means then comprise two jacks 32, wherein each is connected to a respective movable abutment 23. These two jacks 32 are controlled by the same control member 28 via a pneumatic circuit.

Advantageously, the unlocking means are configured to remain active when the seat 8 is in an intermediate angular position between the extreme angular positions.

Advantageously, the support structure comprises two shoulders 40 designed to interact with embedment means of the seat on the support structure when the seat is in one of the extreme angular positions.

The actuation of the control member 28 allows the unlocking of the locking means, i.e. the displacement of the movable abutment 23 to the upper position relative to the corresponding locking element 25.

Advantageously, the actuation of the control member 28 associated with a pushing force on the seat makes it possible to rotatably drive the seat 8, and it is then possible to trigger the action on the control member 28 and continue rotating the seat to one of the extreme angular positions.

Optionally, the seat 8 may be equipped with a rear footrest 42 that is movable between a position of use and a raised position. The rotation device 10 then advantageously comprises means for driving the footrest 42 towards its raised position when the seat 8 is rotated, so that the footrest 42 does not hinder the rotation of the seat 8.

For example, the drive means of the footrest 42 may comprise a lever interacting with the footrest 42 in the position of use, wherein the lever is actuated during the rotation of the seat, for example by coming into contact with a boss provided for this purpose, thus tilting the footrest 42 to its raised position.

It should be noted that the invention is not limited to the embodiment described above, but could have various complementary variants.

Alternatively, the unlocking means could, in particular, comprise two or more pneumatic control members. In this case, it could be provided that the unlocking is activated only when the two control members are actuated simultaneously.

The invention claimed is:

1. A rotation device for rotating a seat around a vertical axis, wherein the seat is intended to equip a railway vehicle, wherein it comprises:
   a locking device locking the seat in first and second extreme angular positions of the seat, wherein the locking device comprises at least one movable abutment carried by the seat and intended to interact with a first complementary abutment when the seat is in its first extreme angular position and with a second complementary abutment when the seat is in its second extreme angular position, wherein the at least one movable abutment may be moved between a locked position in which it is located at the same level as the corresponding first or second fixed abutment, and an unlocked position in which it is located above the corresponding first or second fixed abutment, and
   an unlocking device unlocking the seat, comprising:

at least one first pneumatic control member, and a pneumatic driver for driving the at least one movable abutment from its locked position to its unlocked position when the first pneumatic control member is actuated and wherein the pneumatic driver comprises a pneumatic jack, comprising a rod interacting with the at least one movable abutment.

2. The rotation device according to claim 1, wherein the rod is provided with a handle, allowing its manual movement in case of failure of the pneumatic driver.

3. The rotation device according to claim 1, wherein it comprises a support structure for supporting the seat, and wherein the first pneumatic control member is in the form of a pedal arranged on the support structure.

4. The rotation device according to claim 1, wherein the unlocking device is configured to remain active when the seat is in an intermediate angular position between the first and second extreme angular positions.

5. The rotation device according to claim 1, wherein the at least one movable abutment is rotatable about a pivot linkage carried by the seat.

6. A rotation device for rotating a seat around a vertical axis, wherein the seat is intended to equip a railway vehicle, wherein it comprises:

a locking device locking the seat in first and second extreme angular positions of the seat, wherein the locking device comprises at least one movable abutment carried by the seat and intended to interact with a first complementary abutment when the seat is in its first extreme angular position and with a second complementary abutment when the seat is in its second extreme angular position, wherein the movable abutment may be moved between a locked position in which it is located at the same level as the corresponding first or second fixed abutment, and an unlocked position in which it is located above the corresponding first or second fixed abutment, and an unlocking device unlocking the seat, comprising:
at least one first pneumatic control member, and
a pneumatic driver driving the movable abutment from its locked position to its unlocked position when the first pneumatic control member is actuated, and wherein the seat is equipped with a rear footrest that is movable between a position of use and a raised position, and wherein the rotation device comprises a driver driving the footrest towards its raised position when the seat is rotated.

7. A rotation device for rotating a seat around a vertical axis, wherein the seat is intended to equip a railway vehicle, wherein it comprises:

a locking device locking the seat in first and second extreme angular positions of the seat, wherein the locking device comprises at least one movable abutment carried by the seat and intended to interact with a first complementary abutment when the seat is in its first extreme angular position and with a second complementary abutment when the seat is in its second extreme angular position, wherein the movable abutment may be moved between a locked position in which it is located at the same level as the corresponding first or second fixed abutment, and an unlocked position in which it is located above the corresponding first or second fixed abutment, and an unlocking device unlocking the seat, comprising:
at least one first pneumatic control member, and
a pneumatic driver driving the movable abutment from its locked position to its unlocked position when the first pneumatic control member is actuated, and wherein the rotation device comprises a support structure for supporting the seat, and wherein the support structure comprises an abutment for lateral wedging of the seat in the first or second extreme position.

8. The rotation device according to claim 7, wherein the support structure comprises two shoulders designed to interact with an embedding device for embedding the seat on the support structure when the seat is in one of the extreme angular positions.

\* \* \* \* \*